Dec. 30, 1930.  C. W. EBELING  1,786,903
COMBINED MOTION PICTURE PROJECTOR AND PHOTOGRAPHIC
SOUND REPRODUCING MACHINE
Filed Nov. 27, 1929   3 Sheets-Sheet 1

Inventor
Charles W. Ebeling

By David Pelton Moore
Attorney

Dec. 30, 1930.  C. W. EBELING  1,786,903
COMBINED MOTION PICTURE PROJECTOR AND PHOTOGRAPHIC
SOUND REPRODUCING MACHINE
Filed Nov. 27, 1929  3 Sheets-Sheet 2

Inventor
Charles W. Ebeling
By David Pelton Moore
Attorney

Dec. 30, 1930. C. W. EBELING 1,786,903
COMBINED MOTION PICTURE PROJECTOR AND PHOTOGRAPHIC
SOUND REPRODUCING MACHINE
Filed Nov. 27, 1929  3 Sheets-Sheet 3

Inventor
Charles W. Ebeling

By David Pelton Moore
Attorney

Patented Dec. 30, 1930

1,786,903

UNITED STATES PATENT OFFICE

CHARLES W. EBELING, OF NEW YORK, N. Y., ASSIGNOR TO GENERAL TALKING PICTURES CORPORATION, OF NEW YORK, N. Y., A CORPORATION OF DELAWARE

COMBINED MOTION-PICTURE PROJECTOR AND PHOTOGRAPHIC SOUND-REPRODUCING MACHINE

Application filed November 27, 1929. Serial No. 410,233.

The present invention relates to improvements in combined motion picture projectors and photographic sound reproducing machines, one object of the invention being the provision of a mechanism in which there is interposed between the base of the motion picture projector, a photographic sound mechanism carrying casing or sound-on-film head which in turn carries a film progressing mechanism and supports the casing of the motion picture projector, which in turn carries its film progressing mechanism, the two mechanisms being so connected that the unsteady movement imparted to the film by the film progressing mechanism of the motion picture projector will be smoothed out by the film progressing mechanism of the photographic sound reproducing mechanism, the two film progressing mechanisms being connected to be operated in timed relation.

Another object of the present invention is the provision of a device of this character in which the main drive shaft of the complete mechanism is the main drive shaft of the film progressing mechanism of the photographic sound mechanism, this drive shaft being connected to an auxiliary or driven shaft which constitutes the driving mechanism for the film progressing mechanism of the motion picture projector, thus providing a means whereby the present type of photographic sound reproducing mechanism may be readily interposed or connected to a motion picture projector to convert the same from a silent film projecting machine to a sound film projecting machine.

Referring to drawings, the numeral 5 designates the base of the motion picture projector machine with the usual lower film magazine 6 and drive pulley 7 for the reel thereof, not shown, which is driven by means of a belt 8.

Figure 1:
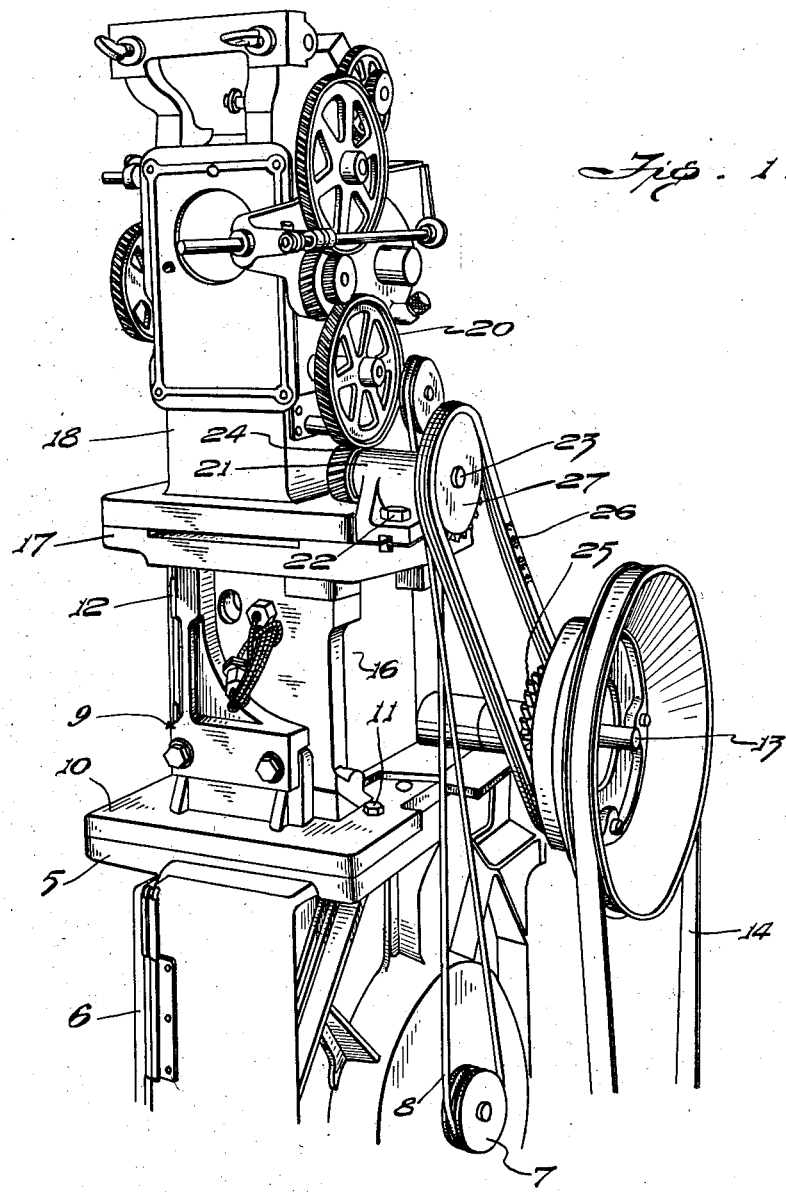
Figure 1 is a perspective view of the complete machine looking from the front with the shutter and lamp house removed to more clearly show the complete mechanism when the machine is assembled.
Figure 2:
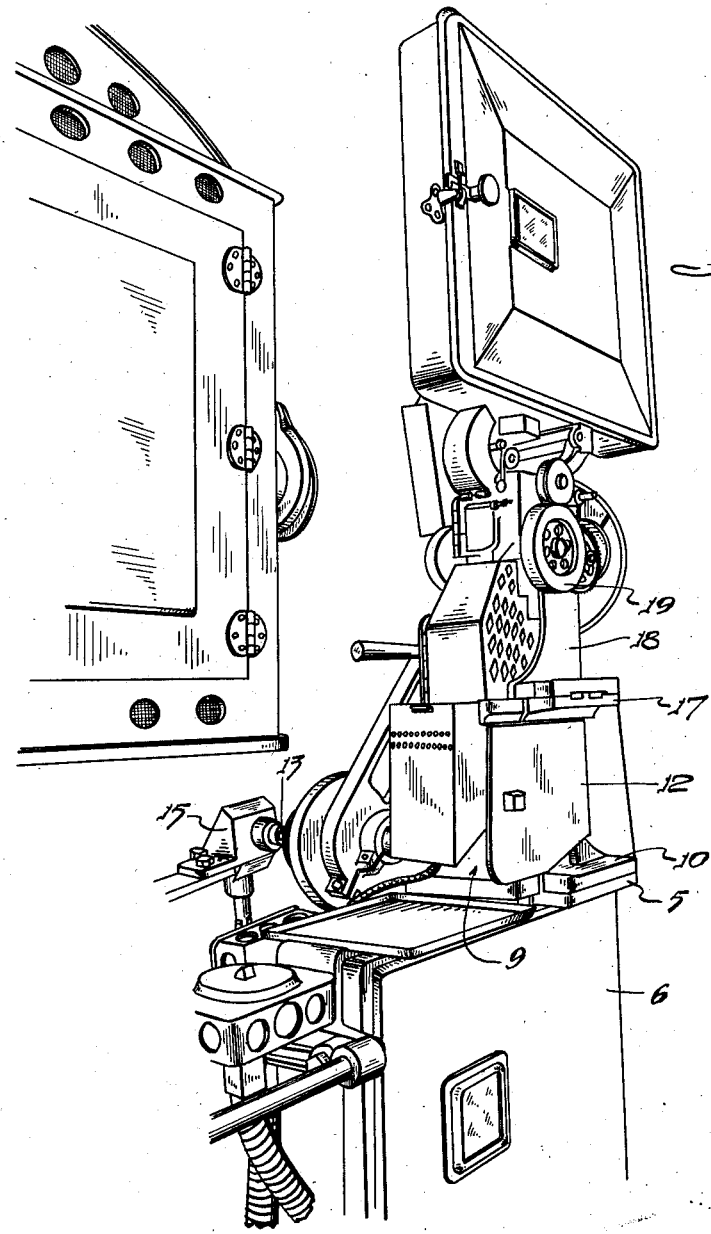
Figure 2 is a similar view to Figure 1 taken from the rear and from the opposite side of the mechanism.
Figure 3:
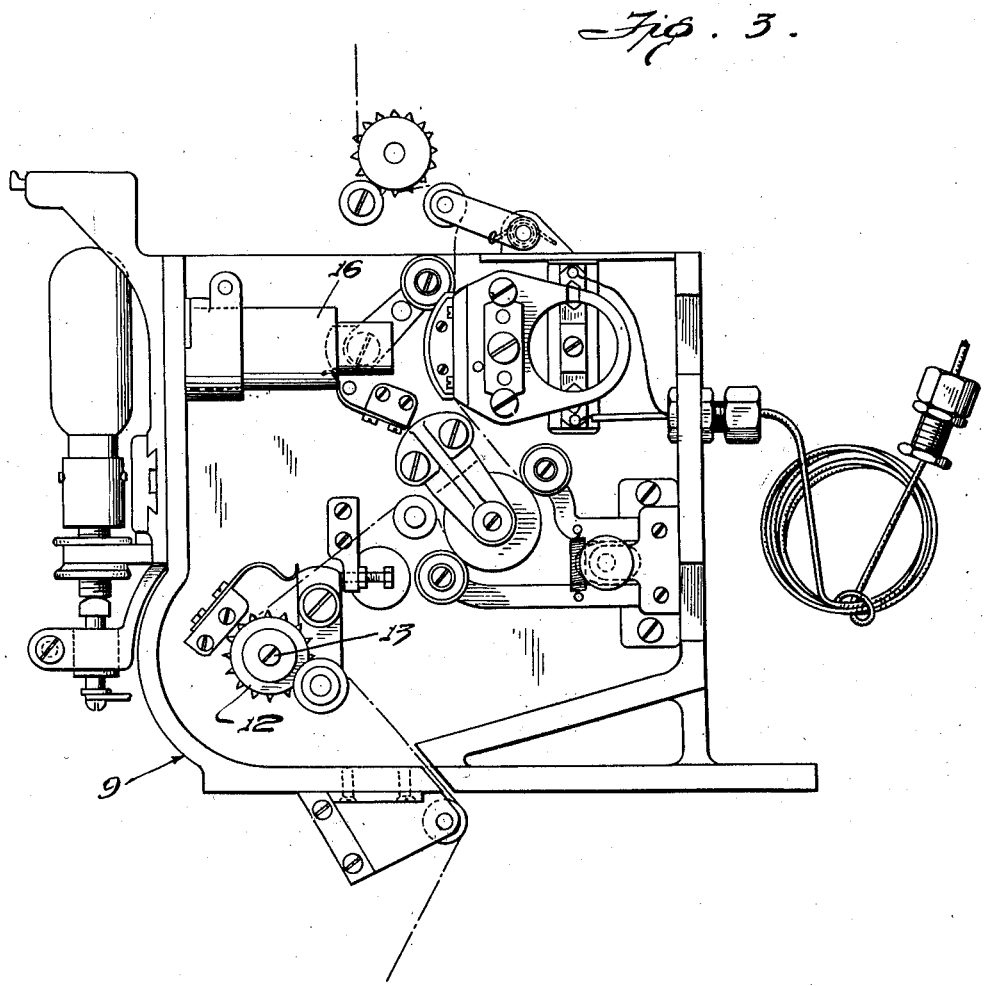
Figure 3 is a side elevation of the photographic sound reproducing machine with the door removed to show the interior film progressing mechanism and the optical system.

The photographic sound reproducing machine or sound-on-film head 9 consists of a base plate 10 secured by fastenings or bolts 11 to the base 5 of the motion picture projector and encased within the same is a film progressing mechanism 12 operated by a drive shaft 13 which shaft may be driven in any desired manner either through a belt 14 or through a gear box 15 as shown in Figure 2. The head 9 supports properly an optical system 16.

A supporting flange 17 is carried by the head 9 at the upper portion thereof and has attached thereto by bolts or other fastening means, a casing 18 which/as usual supports the film progressing mechanism 19, there being a main driven gear 20 which is utilized in operating said mechanism, as will be seen later on.

In order that the intermittent motion imparted by this mechanism to the film during its progress through the projecting machine may not be imparted to the film within the head 9, a journal 21 is suitably attached by bolts 22 to the flange 17 and said journal has mounted therein a driven shaft 23 upon the inner end of which is disposed a gear 24 which meshes with to drive the gear 20.

Mounted upon the shaft 13 is a sprocket 25 which through a silent chain 26 rotates a sprocket 27 mounted upon the short driven shaft 23 thus providing a transmission means between the shaft 13 that absorbs and filters out any irregularities from the motion picture projector head 18, thus providing a thoroughly efficient and practical combination so that the film when passing the optical system in the sound-on-film head 9 is presented in the most practical and efficient manner for eliminating extraneous sound.

From the foregoing description taken in connection with the drawings, it is apparent that with the present type of photographic sound reproducing head that a well known type of motion picture projector may be readily equipped with the same so as to convert said projector from a silent film projecting machine to a sound film projecting machine, and that by this particular mounting the unevenness or irregular motion imparted to the film by the film progressing mechanism of the projector will be substantially eliminated with the present mechanism and a clearer and better sound effect will result.

What is claimed is:—

1. In a machine of this character, the combination of a supporting base, a photographic sound apparatus casing mounted thereon, and having a film progressing mechanism and a main drive shaft, a motion picture projecting apparatus casing mounted upon and carried by the first casing and having a film progressing mechanism, a driven shaft operably connected to the latter film progressing mechanism, and means for operably connecting the drive shaft to the driven shaft so that both film progressing mechanisms are operated in timed relation.

2. In a machine of the character set forth in claim 1, in which the latter means includes two sprockets, connected respectively to the driving and driven shaft, and a silent chain connecting said sprockets.

3. In a machine of this character, the combination of a supporting base, a photographic sound apparatus casing mounted thereon, and having a film progressing mechanism and a main drive shaft, a motion picture projector apparatus casing mounted upon and carried by the first casing and having a film progressing mechanism, a gear exterior of the latter casing and connected to the film progressing mechanism, a shaft journal carried by the first casing, a driven shaft mounted therein and operably connected to the drive shaft, and a gear carried by the driven shaft and meshing with the gear of the motion picture projecting apparatus film progressing mechanism.

In testimony whereof I affix my signature.

CHARLES W. EBELING.